Feb. 17, 1959         P. J. URBON         2,873,858
FILTER AND METHOD OF MAKING SAME
Filed Sept. 21. 1955                3 Sheets-Sheet 1

INVENTOR.
PETER J. URBON
BY
Raymond A. Paquin
ATTORNEY.

Feb. 17, 1959 P. J. URBON 2,873,858
FILTER AND METHOD OF MAKING SAME
Filed Sept. 21. 1955 3 Sheets-Sheet 2
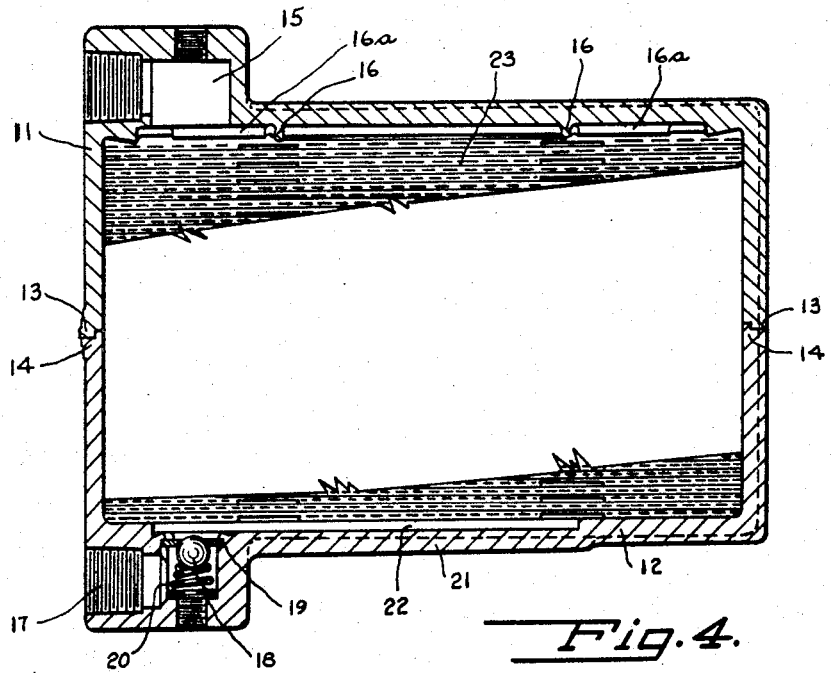
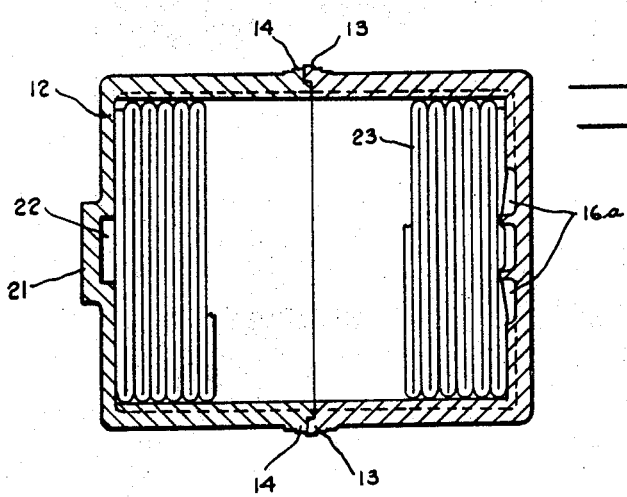
INVENTOR.
PETER J. URBON Feb. 17, 1959     P. J. URBON     2,873,858
FILTER AND METHOD OF MAKING SAME
Filed Sept. 21. 1955     3 Sheets-Sheet 3
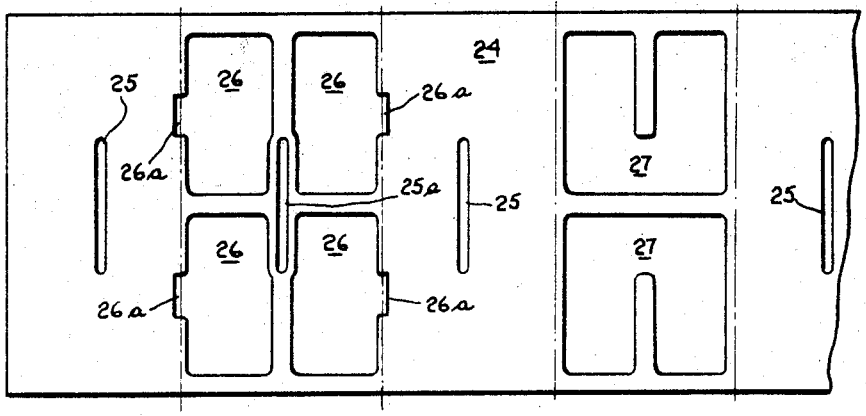
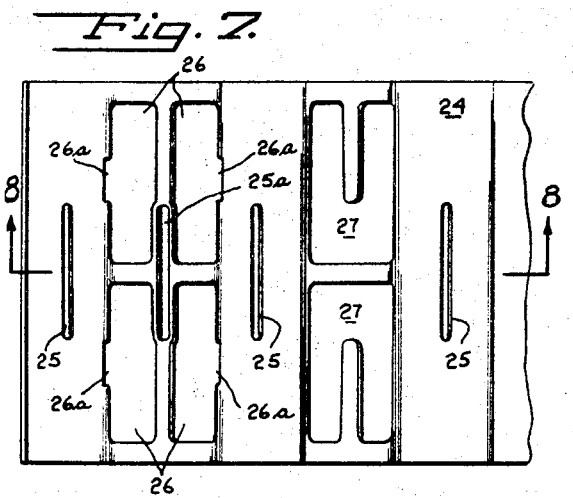
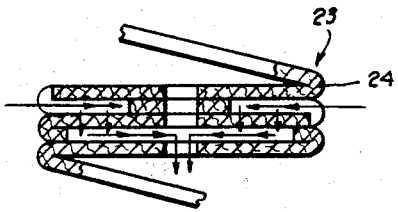
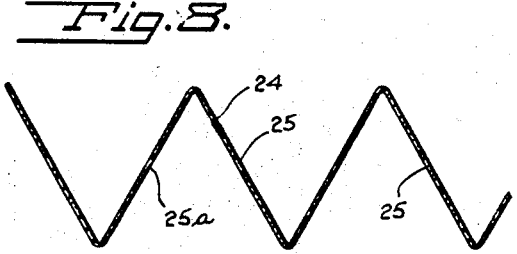
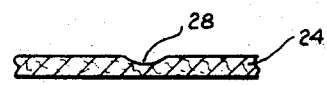
INVENTOR.
PETER J. URBON
BY
*Raymond A. Paquin*
ATTORNEY.

United States Patent Office 2,873,858
Patented Feb. 17, 1959

2,873,858

FILTER AND METHOD OF MAKING SAME

Peter J. Urbon, Northampton, Mass., assignor to American Bosch Arma Corporation, a corporation of New York Application September 21, 1955, Serial No. 535,709

10 Claims. (Cl. 210—443)

This invention relates to fluid filters and to the process of making the same.

The principal object of the invention is to provide a new and improved fluid filter and filtering element and the method of making the same whereby there is provided a relatively simple and economical filter which is efficient in operation.

Other objects and advantages of the invention will be apparent from the following description taken in connection with the accompanying drawings. It will be understood that changes may be made in the details of construction and arrangement of parts without departing from the scope of the invention as set forth in the accompanying claims as the preferred form has been given by way of illustration only.

Referring to the drawings:

Fig. 4 is a sectional view taken on line 4—4 of Fig. 1, looking in the direction of the arrows;

Fig. 5 is a sectional view taken on line 5—5 of Fig. 1, looking in the direction of the arrows;

Fig. 6 is a view illustrating a step in the process of manufacture of the filter element;

Fig. 7 is a view similar to Fig. 6, but illustrating a further step in the manufacture of the filter element;

Fig. 8 is a sectional view taken on line 8—8 of Fig. 7, looking in the direction of the arrows;

Fig. 9 is a side view illustrating the flow of fluid through the filtering element;

Figs. 10, 11 and 12 are fragmentary sectional views illustrating possible treatments of the filter material before forming the filter element.

Figure 1:
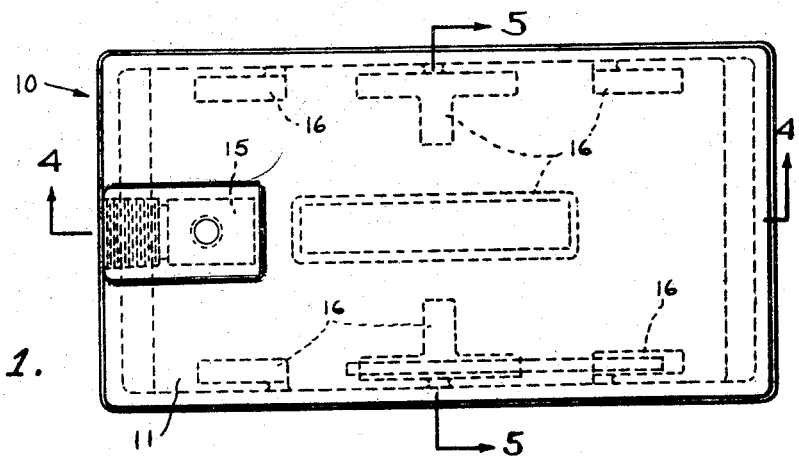
Fig. 1 is a top view of a filter constructed according to the invention.
Figure 2:
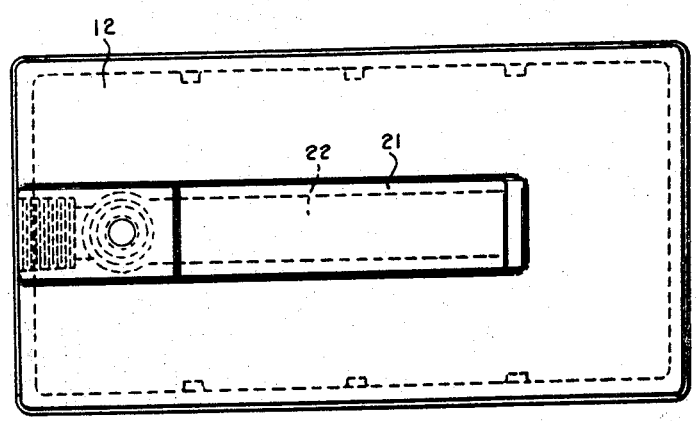
Fig. 2 is a bottom view thereof.
Figure 3:
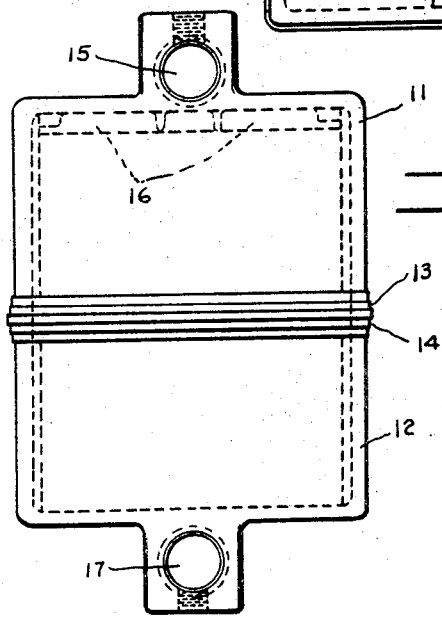
Fig. 3 is an end view thereof.

Referring more particularly to the drawings wherein similar reference characters designate corresponding parts throughout, the device embodying the invention consists of a housing designated generally at 10 and which is formed of an upper section 11 and a lower section 12 having mating edges 13 and 14 respectively which may be secured together to retain the hollow housing sections 11 and 12 in assembled relation.

The housing sections 11 and 12 may be formed of metal or molded from suitable plastic or thermal setting materials depending upon the use to be made of the complete filter.

The upper housing section 11 is provided with the inlet passage 15 and with the internally projecting ribs 16 and forming inlet passages within the housing section as hereinafter described.

The housing sections 11 and 12 may be secured together by cementing or fusing or interlocked together or suitable clamping and sealing mechanism may be employed.

The lower section 12 of the housing is provided with the outlet passage 17 in which is positioned the outwardly opening check valve 18 sealed on the seat 19 which may be a metal insert where the housing is formed of plastic material and the spring 20 serves to retain the valve 18 on the seat and while such spring is usually a very light spring, it could be controlled so as to control the opening pressure of the valve.

The housing section 12 is provided with the offset portion 21 which forms an internal outlet passage 22 communicating with the outlet 17.

Within the housing 10 is positioned the filter element designated generally at 23 and which is formed of a strip 24 of suitable filtering media such as filter paper, which is folded into pleated arrangement with adjacent portions folded into overlying relation.

As will be seen from the drawings, the adjacent portions are provided with cutout areas of suitable predetermined contour and, as will be seen from Fig. 6, these cutouts could consist of an opening 25 in one area of the blank or strip and the next area having the openings 26 with the openings 25a similar to and adapted to overlie opening 25. Cutouts 26 are provided with the slots 26a which are adapted to extend beyond the bend or fold line of the strip. The next area of the blank or strip could be similar to the first and then the following areas having cutouts of the configuration 27, and the successive areas could then have cutouts similar to those described and in the same order, that is, the pattern shown and described would be repeated throughout the length of the strip.

While it is not necessary with some materials to provide such means for the folds, the material could be scored as shown at 28 in Fig. 10 or embossed as shown at 29 in Fig. 11, or perforated as shown at 30 in Fig. 12, across the strip at the point the strip is to be bent or folded and thus facilitating the folding or bending of the material flat as shown in Fig. 9.

The fluid to be filtered enters through inlet 15 and passes over the top of the filter element 23 through the passage 16a formed by the ribs 16 which retain the filter in spaced relation with the adjacent wall of the housing and the fluid then goes down both sides of the filter where it enters between adjacent filtering layers, as shown by arrows in Fig. 9, and the fluid then passes through the filter media to the central opening of the filter from which it passes into the outlet passage 22 from which it opens check valve 18 and thus allows passage of the fluid into a line connected to the outlet 17.

It will be seen that by forming a filter element from a strip of material with the strip formed into superimposed or pleated sections with successive sections in overlying relation and with the filter element formed as described and placed into the simplified housing or casing that there has been provided a new filter which is relatively simple and inexpensive to manufacture and assemble and yet efficient in operation.

From the foregoing it will be seen that I have provided new and improved means and process for obtaining all of the objects and advantages of the invention.

I claim:

1. In a device of the character described, a housing having an inlet and an outlet, a filter element in said housing, said element comprising a strip of filtering material folded into pleated arrangement with successive portions being in adjacent overlying engaging relationship, said successive portions having cutout areas of different configuration with all of said portions having aligned openings.

2. A filter element comprising a strip of filtering material, said strip having portions folded into overlying adjacent engaging relationship with adjacent folded portions of said strip having cutout portions of different configuration with all of said portions having aligned openings.

3. In a device of the character described, a housing having an inlet and an outlet, a filter element in said housing, said element comprising a strip of filtering material folded into pleated arrangement with successive portions having cutouts of different configuration and being in adjacent overlying engaging relationship, and passages adjacent opposite walls of said casing, one of said passages communicating with the inlet and the other of said passages communicating with said outlet with all of said portions having aligned openings.

4. In a device of the character described, a housing having an inlet and an outlet, a filter element in said housing, said element comprising a strip of filtering material folded into pleated arrangement with successive portions being in adjacent overlying engaging relationship with cutouts of different configuration, said housing being formed of a pair of hollow sections secured together in opposed relation with all of said portions having aligned openings.

5. In a device of the character described, a housing having an inlet and an outlet, a filter element in said housing, said element comprising a strip of filtering material folded into pleated arrangement with successive portions being in overlying engaging relationship with all of said portions having aligned openings, said housing being formed of a pair of hollow sections secured together in opposed relation, said hollow sections having integral means on opposite surfaces for forming passages communicating with said inlet and outlet respectively.

6. In a device of the character described, a housing having an inlet and an outlet, a filter element in said housing, said element comprising a strip of filtering material folded into pleated arrangement with successive portions being in adjacent overlying engaging relationship with all of said portions having aligned openings, said housing being formed of a pair of molded hollow sections secured together in opposed relation.

7. In a device of the character described, a housing having an inlet and an outlet, a filter element in said housing, said element comprising a strip of filtering material folded into pleated arrangement with successive portions being in overlying adjacent engaging relationship with all of said portions having aligned openings, said housing being formed of a pair of molded hollow sections secured together in opposed relation, said hollow sections having integral means on opposite surfaces for forming passages communicating with said inlet and outlet respectively.

8. The method of forming a filter element comprising forming a strip of filtering material with successive areas having cutouts of different configuration and forming said strip of material with said successive areas in adjacent overlying engaging arrangement.

9. The method of forming a filter comprising folding a strip of filtering material into pleated arrangement with successive pleats in overlying adjacent engaging relationship, forming a casing having inlet and outher passages in opposed walls and placing said element in the casing having inlet and outlet passages each communicating with passages in the opposed sides of said assembled strip.

10. The method of forming a filter element comprising forming a strip of filtering material with successive areas having cutouts of different configuration and folding said strip of material with said successive area in overlying engaging arrangement, forming a casing having inlet and outlet passages in opposed walls and placing said element in said casing with said inlet and outlet passages on opposed sides of said assembled strip.

References Cited in the file of this patent

UNITED STATES PATENTS

| | | |
|---|---|---|
| 1,076,128 | Kupferle | Oct. 21, 1913 |
| 2,401,222 | Briggs | May 28, 1946 |
| 2,488,726 | Judkins | Nov. 22, 1949 |
| 2,518,285 | Coleman | Aug. 8, 1950 |
| 2,561,685 | Boggs | July 24, 1951 |